(12) United States Patent
Welcher et al.

(10) Patent No.: US 8,960,945 B1
(45) Date of Patent: Feb. 24, 2015

(54) PERSONALLY PORTABLE SOLAR-POWERED ELECTRICAL ENERGY SOURCE

(76) Inventors: Jon Ryan Welcher, Elfin Forest, CA (US); Tara Welcher, Elfin Forest, CA (US)

( * ) Notice: Subject to any disclaimer, the term of this patent is extended or adjusted under 35 U.S.C. 154(b) by 297 days.

(21) Appl. No.: 13/550,986

(22) Filed: Jul. 17, 2012

(51) Int. Cl.
*F21L 4/08* (2006.01)
(52) U.S. Cl.
USPC .......................................... 362/183; 362/192
(58) Field of Classification Search
CPC ..... H02J 7/0013; H02J 7/0021; H02J 7/0024; H02J 7/0027; H02J 7/0042; H02J 7/0044; H02J 7/0047; H02J 7/005; H02J 7/34; H02J 7/35; H01M 10/44; H01M 10/46; H01M 10/465; F21L 13/00
USPC ............ 362/183, 184, 190, 192, 277, 311.02, 362/311.14; 320/101, 103, 107, 111, 134, 320/136
See application file for complete search history.

(56) References Cited

U.S. PATENT DOCUMENTS

| | | | | |
|---|---|---|---|---|
| 2007/0285053 A1* | 12/2007 | Noguchi et al. | ............... | 320/114 |
| 2010/0027249 A1* | 2/2010 | Connor et al. | ................ | 362/183 |

* cited by examiner

*Primary Examiner* — Thomas M Sember
(74) *Attorney, Agent, or Firm* — Edward W. Callan

(57) ABSTRACT

A personally portable solar-powered electrical energy source includes a personally portable chassis; an array of solar cells mounted on the chassis, with the solar cells being adapted to generate electrical energy from light captured by the solar cells; a battery charger disposed in the chassis and so coupled to the solar cells as to be able to charge a battery installed in the chassis with the electrical energy generated by the solar cells; and at least one electrical outlet disposed in the chassis and adapted for providing electrical energy to an external electrical device from a said installed battery. The solar-powered electrical energy source can provide electrical energy to an electrically chargeable external electrical device, such as cell phone, and thereby charge the electrically chargeable external electrical device.

10 Claims, 3 Drawing Sheets

(a) SO COUPLING AN EXTERNAL ELECTRICAL DEVICE 24 TO AN ELECTRICAL OUTLET 16 INCLUDED IN THE CHASSIS 11 OF THE SOLAR-POWERED ELECTRICAL ENERGY SOURCE 10 AS TO BE ABLE TO POWER THE EXTERNAL ELECTRICAL DEVICE 24 WITH ELECTRICAL ENERGY PROVIDED BY THE BATTERY 22 INSTALLED IN THE SOLAR-POWERED ELECTRICAL ENERGY SOURCE 10

↓

(b) ACTUATING THE SOLAR-POWERED ELECTRICAL ENERGY SOURCE 10 TO SUPPLY ELECTRICAL POWER TO THE EXTERNAL ELECTRICAL DEVICE 24

FIG. 4

(a) SO COUPLING AN ELECTRICALLY CHARGEABLE EXTERNAL ELECTRICAL DEVICE 27 TO AN ELECTRICAL OUTLET 17 OF THE SOLAR-POWERED ELECTRICAL ENERGY SOURCE AS TO BE ABLE TO POWER THE EXTERNAL ELECTRICAL DEVICE 27 WITH ELECTRICAL ENERGY PROVIDED BY THE INSTALLED BATTERY

↓

(b) ACTUATING THE SOLAR-POWERED ELECTRICAL ENERGY SOURCE 10 TO PROVIDE ELECTRICAL ENERGY TO THE ELECTRICALLY CHARGEABLE EXTERNAL ELECTRICAL DEVICE 27 AND THEREBY CHARGE THE ELECTRICALLY CHARGEABLE EXTERNAL ELECTRICAL DEVICE 27

FIG. 5

(a) UTILIZING THE BATTERY CHARGER 14 IN THE SOLAR-POWERED ELECTRICAL ENERGY SOURCE 10 TO CHARGE THE INSTALLED BATTERY 22 WITH THE ELECTRICAL ENERGY GENERATED BY THE SOLAR CELLS 12

↓

(b) CAUSING THE INSTALLED BATTERY 22 TO BE CHARGED WITH ELECTRICAL ENERGY FROM AN AC ELECTRICAL POWER SOURCE 28 COUPLED BY AN AC-TO-DC CONVERTER 30 TO THE INSTALLED BATTERY 22 VIA A PORT 20 DISPOSED IN THE CHASSIS 11.

PERSONALLY PORTABLE SOLAR-POWERED ELECTRICAL ENERGY SOURCE

BACKGROUND OF THE INVENTION

The present invention is directed to solar-powered electrical energy sources and is particularly directed to personally portable solar-powered electrical energy sources. Solar-powered electrical energy sources are included in such personally portable devices as solar-powered lamps, solar-powered calculators, and solar-powered watches, among others. The electrically powered output components of such personally portable devices, such as the lamp, the calculator and the watch, are powered by electrical energy from an internal battery that has been charged by an internal battery charger with electrical energy generated by solar cells from light captured by solar cells that are mounted on the device. As used herein, "personally portable" is defined to mean "configured to be easily moved around by one person".

SUMMARY OF THE INVENTION

The present invention provides a personally portable solar-powered electrical energy source, comprising: a personally portable chassis; an array of solar cells mounted on the chassis, with the solar cells being adapted to generate electrical energy from light captured by the solar cells; a battery charger disposed in the chassis and so coupled to the solar cells as to be able to charge a battery installed in the chassis with the electrical energy generated by the solar cells; and at least one electrical outlet disposed in the chassis and adapted for providing electrical energy to an external light-emitting electrical device from a charged said installed battery; wherein the chassis includes a plurality of sets of threads of different diameters for engagement with threads of bottles respectively having threads of one of said different diameters so that a said bottle can be so coupled to the chassis as to function as a globe enclosing a said external light-emitting electrical device when electrical energy is provided thereto from the at least one electrical outlet.

The present invention also provides a hand-held solar-powered electrical energy source, comprising: a personally portable chassis; an array of solar cells mounted on the chassis, with the solar cells being adapted to generate electrical, energy from light captured by the solar cells; a battery charger disposed in the chassis and so coupled to the solar cells as to be able to charge a battery installed in the chassis with the electrical energy generated by the solar cells; at least one electrical outlet disposed in the chassis and adapted for providing electrical energy to an external electrical device from a charged said installed battery; and a battery-charge sensor that is adapted to sense the amount of an electrical energy charge of the installed battery, and a controller that is energized by the installed battery and adapted to control the operation of the battery charger, wherein the controller is also adapted to be so coupled to the installed battery via the battery-charge sensor as to monitor the amount of an electrical energy charge in the battery, and wherein the controller is further adapted to prevent the battery from being discharged by provision of electrical energy to an external device when the monitored amount of the electrical energy charge in the battery is below a particular threshold.

The present invention also provides a method of supplying electrical power to an electrical device, comprising the steps of:

(a) with a solar-powered electrical energy source that includes a personally portable chassis, an array of solar cells mounted on the chassis, with the solar cells being adapted to generate electrical energy from light captured by the solar cells; a battery charger disposed in the chassis and so coupled to the solar cells as to be able to charge a battery installed in the chassis with the electrical energy generated by the solar cells; and at least one electrical outlet disposed in the chassis and adapted for providing electrical energy to an external electrical device from the installed battery, (b) so coupling a said external electrical device to the at least one electrical outlet as to be able to power the external electrical device with electrical energy provided by the installed battery;

(c) actuating the solar-powered electrical energy source to supply electrical power to the external electrical device;

(d) monitoring the amount of an electrical energy charge of the installed battery; and (e) preventing the installed battery from being discharged by provision of electrical energy to an external device when the monitored amount of the electrical energy charge in the battery is below a particular threshold.

Additional features of the present invention are described with reference to the detailed description of the preferred embodiments.

BRIEF DESCRIPTION OF THE DRAWING

FIG. 4 is a block diagram illustrating an exemplary embodiment of one method using a solar-powered electrical energy source according to the present invention.

FIG. 5 is a block diagram illustrating an exemplary embodiment of another method using a solar-powered electrical energy source according to the present invention.

FIG. 6 is a block diagram illustrating an exemplary embodiment of a method that includes a step that utilizes an energy source other than solar energy for also charging a battery installed in the solar-powered electrical energy source according to the present invention.

DETAILED DESCRIPTION

Figure 1:
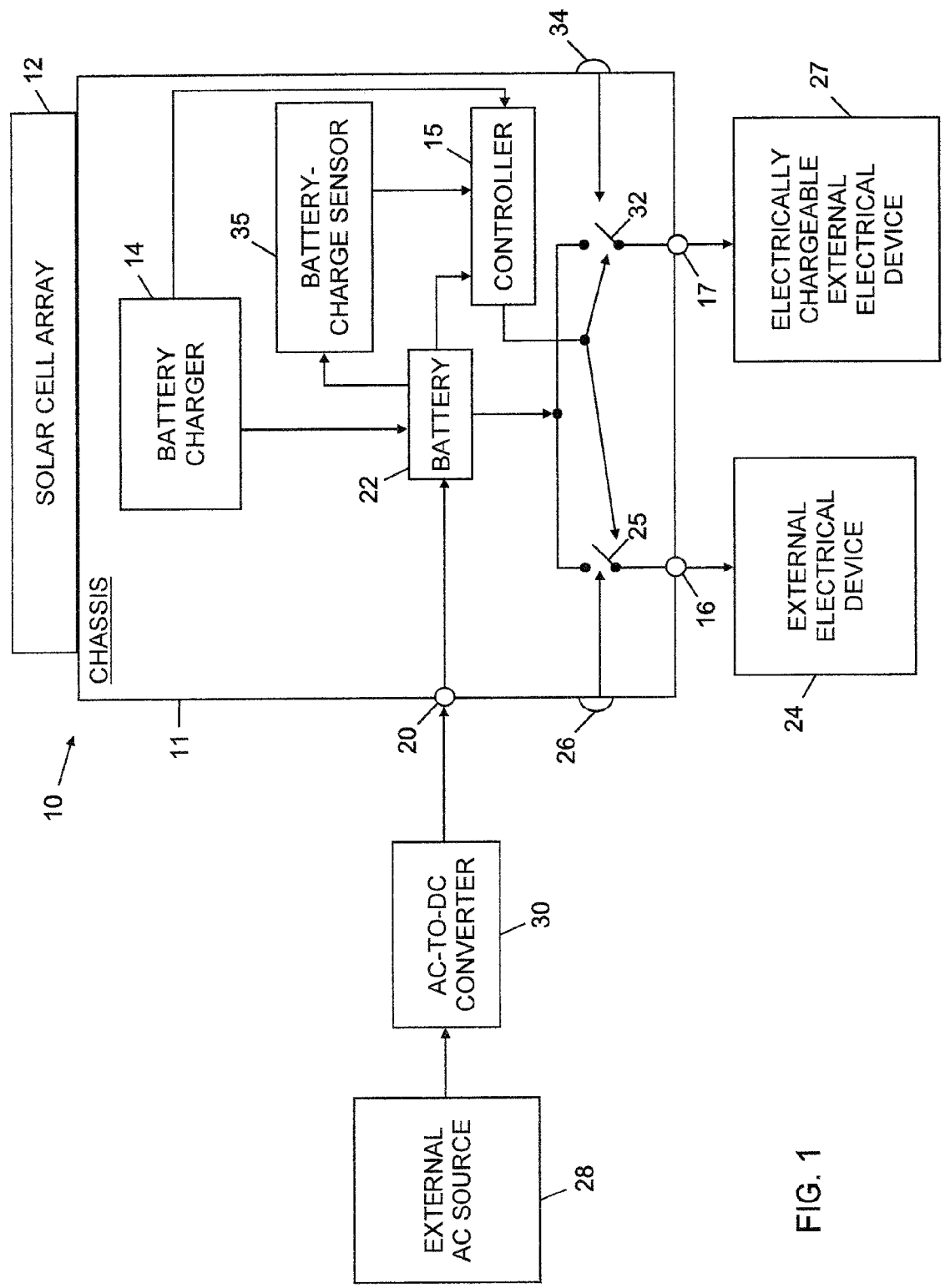
FIG. 1 is a block diagram of an exemplary embodiment of a solar-powered electrical energy source according to the present invention.

Referring to FIG. 1, an exemplary embodiment of a solar-powered electrical energy source 10 according to the present invention includes a personally portable chassis 11, an array of solar cells 12 mounted on the chassis 11, a battery charger 14, a controller 15 and a plurality of electrical outlets 16, 17 disposed in the chassis 11 and an input port 20.

The solar cells 12 are adapted to generate electrical energy from light captured by the solar cells 12. The battery charger 14 is so coupled to the solar cells 12 as to be able to charge a battery 22 installed in the chassis 11 with the electrical energy generated by the solar cells 12. Preferably, the battery 22 is a rechargeable battery, such as a lithium battery or a NiCd battery, among others. The battery 22 is so installed in the chassis 11 as to be able to be charged by the battery charger 14.

The controller 15 is energized by the battery 22. The controller 15 is adapted to control the operation of the battery charger 14.

At least one electrical outlet 16 is adapted for providing electrical energy to an external electrical device 24 from the installed battery 22. A switch 25 is connected between the battery 22 and the electrical outlet 16. The switch 25 can be opened or closed selectively in response to operation of a push button actuator 26 disposed on the chassis 11, or in response to a signal from the controller 15.

Another electrical outlet 17 is adapted for being so coupled to an input of an electrically chargeable external electrical device 27 as to provide electrical energy for charging the electrically chargeable external electrical device 27, such as a cellphone. A switch 32 is connected between the battery 22 and the electrical outlet 17. The switch 32 can be opened or closed selectively in response to operation of a push button actuator 34 disposed on the chassis 11, or in response to a signal from the controller 15.

The amount of voltage and/or current of the electrical energy that is provided to the respective external device 24, 27 is limited so that the rated electrical energy specifications for operation of the external device 24, 27 are not exceeded.

The input port 20 is disposed in the chassis 11 for enabling an installed battery 22 to also be charged from an AC electrical power source 28 via an AC-to-DC converter 30. An example of such a converter 30 that is adapted for charging a battery in a portable device is a travel/AC charger that can recharge a cellphone.

In some embodiments, the chassis 11 also includes a battery-charge sensor 35, which is adapted to sense the electrical energy charge of a battery 22 installed in the chassis 11.

The controller 15 is also adapted to be so coupled to the installed battery 22 via the battery-charge sensor 35 as to monitor the amount of an electrical energy charge of the installed battery 22. The controller 15 is further adapted to prevent the installed battery 22 from being discharged by provision of electrical energy to an external device 24, 27 when the monitored amount of the electrical energy charge in the battery 22 is below a particular threshold. The particular threshold is such that the battery 22 still retains enough charge to enable the controller 15 to control the operation of the battery charger 14. The controller 15 prevents such discharge by causing the switches 25 and 32 to be opened when the monitored amount of the electrical energy charge in the battery 22 is below the particular threshold.

Figure 2:
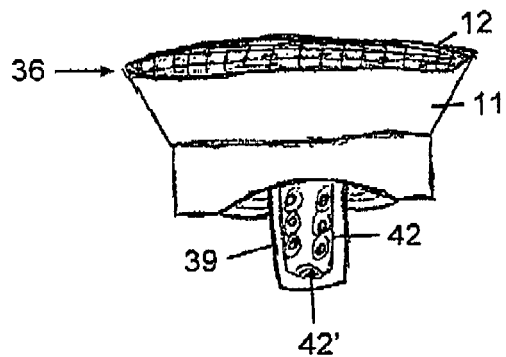
FIG. 2 illustrates one embodiment of an external light-emitting device coupled to the exemplary embodiment of the solar-powered electrical energy source diagramed in FIG. 1.
Figure 3:
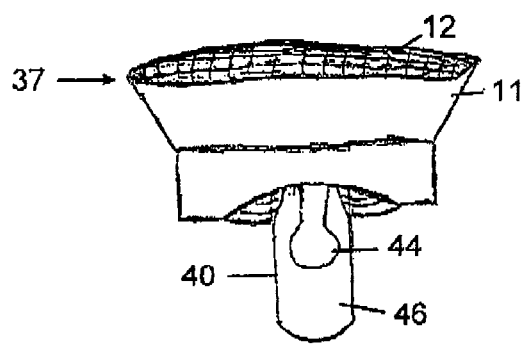
FIG. 3 illustrates another embodiment of an external light emitting device coupled to the exemplary embodiment of the solar-powered electrical energy source diagramed in FIG. 1.

In various exemplary embodiments, as shown in FIGS. 2 and 3 with reference to FIG. 1, the electrical outlet 16 is so coupled to an external electrical device 36, 37 that includes a light-emitting device 39, 40 as to be able to power the light-emitting device 36, 37 with electrical energy provided by a battery 22 installed in the solar-powered electrical energy source 10, to thereby provide a solar-powered light source.

In the embodiment shown in FIG. 2, the light-emitting device 39 includes an array 42 of light emitting diodes (LEDs). In one such embodiment, an LED 42' at a distal end of the array 42 is red and the other LEDs of the array 42 are white. A switch on the external electrical device 36 enables the red LED 42' to be illuminated independently of the other LEDs for use as a night light. In this embodiment, the number of LEDs that are illuminated can be controlled by the setting of a manually operated switch (not shown) mounted on the chassis 11. For example, twelve, twenty-four or thirty-six of a total array of thirty-six LEDs 42 are illuminated in accordance with respective manual settings of "low", "medium" and "high".

In the embodiment shown in FIG. 3, the light-emitting device 40 includes a light bulb 44 and a globe 46 enclosing the light bulb 44. In one such embodiment, the light bulb 44 is an incandescent light bulb. The globe 46 may be transparent or translucent. In one such embodiment, the globe 46 is a bottle.

Figure 3A:
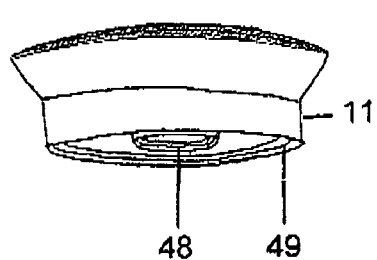
FIG. 3A illustrates the disposition of a pair of sets of threads of different diameters in one embodiment of the chassis of the solar-powered electrical energy source shown in FIG. 3 for enabling the chassis to receive separate bottles respectively having threads of different diameters.
Figure 3B:
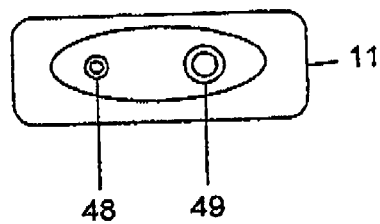
FIG. 3B illustrates the disposition of a pair of sets of threads of different diameters in a modification of the chassis of the embodiment of the solar-powered electrical energy source shown in FIG. 3 for enabling the chassis to simultaneously receive separate bottles respectively having threads of different diameters.

In one embodiment, the chassis 11 includes a plurality of sets of threads 48, 49 of different diameters for engagement with threads of bottles respectively having threads of different diameters. In one such embodiment, as shown in FIG. 3A, the plurality of sets of threads 48, 49, of different diameters are disposed concentrically at different levels in the chassis 11 for receiving a bottle having a set of threads of one of the different diameters. In another embodiment, as shown in. FIG. 3B, the plurality of sets of threads 48, 49 of different diameters are disposed in the chassis 11 for simultaneously receiving separate bottles respectively having threads of different diameters.

Other examples of external electrical devices that can be powered by the solar-powered electrical energy source of the present invention include a computer, a communication device such as a telephone and a short wave radio, an audio/visual device such as a radio, a television or a DVD player, a cooling fan, and a battery charger, among others.

In at least one embodiment, the electrical outlet 17 is adapted for being so coupled to an input of an external battery charger as to provide electrical energy for charging a battery being held for charging by the external battery charger.

Referring to FIG. 4, with further reference to FIG. 1, one exemplary embodiment of a method of using a solar-powered electrical energy source 10 according to the present invention includes the steps of:

(a) so coupling an external electrical device 24 to an electrical outlet 16 included in the chassis 11 of the solar-powered electrical energy source 10 as to be able to power the external electrical device 24 with electrical energy provided by the battery 22 installed in the solar-powered electrical energy source 10; and (b) actuating the solar-powered electrical energy source 10 to supply electrical power to the external electrical device 24.

Referring to FIG. 5, with further reference to FIG. 1, another exemplary embodiment of a method of using a solar-powered electrical energy source 10 according to the present invention includes the steps of:

(a) so coupling an electrically chargeable external electrical device 27 to an electrical outlet 17 of the solar-powered electrical energy source as to be able to power the external electrical device 27 with electrical energy provided by the installed battery; and (b) actuating the solar-powered electrical energy source 10 to provide electrical energy to the electrically chargeable external electrical device 27 and thereby charge the electrically chargeable external electrical device 27.

Referring to FIG. 6, with further reference to FIG. 1, an exemplary embodiment of a method that includes a step that utilizes an energy source other than solar energy for charging a battery 22 installed in the solar-powered electrical energy source 10 according to the present invention, includes the steps of:

(a) utilizing the battery charger 14 in the solar-powered electrical energy source 10 to charge the installed battery 22 with the electrical energy generated by the solar cells 12; and (b) causing the installed battery 22 to be charged with electrical energy from an AC electrical power source 28 coupled by an AC-to-DC converter 30 to the installed battery 22 via a port 20 disposed in the chassis 11.

The benefits specifically stated herein do not necessarily apply to every conceivable embodiment of the present invention. Further, such stated benefits of the present invention are only examples and should not be construed as the only benefits of the present invention.

While the above description contains many specificities, these should not be construed as limitations on the scope of the present invention, but rather as examples of the preferred embodiments described herein. Other variations are possible and the scope of the present invention should be determined not by the embodiments described herein but rather by the claims and their legal equivalents.

The invention claimed is:

1. A personally portable solar-powered electrical energy source, comprising:
    a personally portable chassis;
    an array of solar cells mounted on the chassis, with the solar cells being adapted to generate electrical energy from light captured by the solar cells;
    a battery charger disposed in the chassis and so con led to the solar cells as to be able to charge a battery installed in the chassis with the electrical energy generated by the solar cells; and
    at least one electrical outlet disposed in the chassis and adapted for providing electrical energy to an external light-emitting electrical device from a charted said installed battery;
    wherein the chassis includes a plurality of sets of threads of different diameters for engagement with threads of bottles respectively having threads of one of said different diameters so that a said bottle can be so coupled to the chassis as to function as a globe enclosing a said external light-emitting electrical device when electrical energy is provided thereto from the at least one electrical outlet.

2. The solar-powered electrical energy source according to claim 1, wherein the plurality of sets of threads of different diameters are disposed concentrically at different levels in the chassis.

3. The solar-powered electrical energy source according to claim 1, the plurality of sets of threads of different diameters are disposed in the chassis for simultaneously receiving separate bottles respectively having threads of different diameters.

4. A hand-held solar-powered electrical energy source, comprising:
    a personally portable chassis;
    an array of solar cells mounted on the chassis, with the solar cells being adapted to generate electrical from light captured by the solar cells;
    a battery charger disposed in the chassis and so coupled to the solar cells as to be able to charge a battery installed in the chassis with the electrical energy generated by the solar cells;
    at least one electrical outlet disposed in the chassis and adapted for providing electrical energy to an external electrical device from a charged said installed battery;
    a battery-charge sensor that is adapted to sense the amount of an electrical energy charge of the installed battery, and
    a controller that is energized by the installed battery and adapted to control the operation of the battery charger,
    wherein the controller is also adapted to be so coupled to the installed battery via the battery-charge sensor as to monitor the amount of an electrical energy charge in the battery, and
    wherein the controller is further adapted to prevent the battery from being discharged by provision of electrical energy to an external device when the monitored amount of the electrical energy charge in the battery is below a particular threshold.

5. A method of supplying electrical power to an electrical device, comprising the steps of:
    (a) with a solar-powered electrical energy source that includes a personally portable chassis, an array of solar cells mounted on the chassis, with the solar cells being adapted to generate electrical energy from light captured by the solar cells; a battery charger disposed in the chassis and so coupled to the solar cells as to be able to charge a battery installed in the chassis with the electrical energy generated by the solar cells; and at least one electrical outlet disposed in the chassis and adapted for providing electrical energy to an external electrical device from the installed battery, so coupling a said external electrical device to the at least one electrical outlet as to be able to power the external electrical device with electrical energy provided by the installed battery; and
    (b) actuating the solar-powered electrical energy source to supply electrical power to the external electrical device;
    (c) monitoring the amount of an electrical energy charge of the installed battery; and
    (d) preventing the installed battery from being discharged by provision of electrical energy to an external device when the monitored amount of the electrical energy charge in the battery is below a particular threshold.

6. The method according to claim 5, wherein the at least one external electrical device is a light source.

7. The method according to claim 5, wherein the at least one external electrical device is a computer.

8. The method according to claim 5, wherein the at least one external electrical device is a communication device.

9. The method according to claim 5, wherein the at least one external electrical device is an audio/audio-visual output device.

10. The method according to claim 5, wherein the at least one external electrical device is a battery charger.

* * * * *

UNITED STATES PATENT AND TRADEMARK OFFICE
CERTIFICATE OF CORRECTION

Page 1 of 1

PATENT NO. : 8,960,945 B1
APPLICATION NO. : 13/550986
DATED : February 24, 2015
INVENTOR(S) : Jon Ryan Welcher and Tara Welcher It is certified that error appears in the above-identified patent and that said Letters Patent is hereby corrected as shown below:

In the Claims at column 5, line 28, Claim 1, "con led" should be --coupled--.

at column 5, line 34, Claim 1, "charted" should be --charged--.

Signed and Sealed this
Eighth Day of September, 2015

Michelle K. Lee
*Director of the United States Patent and Trademark Office*